United States Patent [19]

Holste

[11] 4,185,459

[45] Jan. 29, 1980

[54] TURBO-EXHAUST CLEANER

[76] Inventor: Merrill R. Holste, 4600 Leon Grande Ave., SE., Rio Rancho, N. Mex. 87124

[21] Appl. No.: 965,276

[22] Filed: Dec. 1, 1978

Related U.S. Application Data

[63] Continuation-in-part of Ser. No. 596,896, Jul. 17, 1975, abandoned.

[51] Int. Cl.² .............................................. F02G 5/00
[52] U.S. Cl. ............................... 60/280; 60/39.69 A; 60/39.06
[58] Field of Search .............. 123/119 C; 60/280, 303, 60/624, 314, 597, 39.69 A, 39.06, 39.46 R

[56] References Cited

U.S. PATENT DOCUMENTS

| | | | |
|---|---|---|---|
| 1,279,128 | 9/1918 | Lake | 60/624 |
| 2,065,681 | 12/1936 | Fogas | 60/303 |
| 2,173,595 | 9/1939 | Schutte | 60/624 |
| 2,583,651 | 1/1952 | Horning | 60/280 |
| 2,585,968 | 2/1952 | Schneider | 60/624 |
| 2,624,172 | 1/1953 | Houdry | 60/39.46 R |
| 2,673,446 | 3/1954 | DeSalandii | 60/39.5 |
| 2,929,211 | 3/1960 | Meyer | 60/39.82 C |
| 3,444,686 | 5/1969 | Knowles | 60/303 |
| 3,492,148 | 1/1970 | Heruert | 416/241 R |
| 3,550,372 | 12/1970 | Craig | 60/39.75 |
| 3,553,961 | 1/1971 | McReynolds | 60/280 |
| 3,637,320 | 1/1972 | Wakefield | 416/241 R |
| 3,736,752 | 6/1973 | Melchior | 60/303 |
| 3,758,233 | 9/1973 | Kreider | 416/241 R |
| 3,844,113 | 10/1974 | Lockwood | 60/39.52 |
| 3,928,961 | 12/1975 | Pfefferle | 60/39.69 A |
| 3,943,705 | 3/1976 | DeCorso | 60/39.82 C |
| 3,990,242 | 11/1976 | Muller | 60/280 |
| 4,122,673 | 10/1978 | Leins | 60/280 |

FOREIGN PATENT DOCUMENTS

| | | | |
|---|---|---|---|
| 2017447 | 11/1970 | Fed. Rep. of Germany | 60/303 |
| 974728 | 11/1948 | France | 60/624 |

*Primary Examiner*—Ronald H. Lazarus
*Attorney, Agent, or Firm*—Merchant, Gould, Smith, Edell, Welter & Schmidt

[57] ABSTRACT

A method and means for improving the efficiency of movable-piston internal combustion engines and reducing the pollution of the environment produced by their operation. The exhaust gases from the engine are compressed and afterburnt, and this resulting heat energy is converted to mechanical energy in a gas turbine connected to the engine shaft. Details of preferred combustion chambers and of a preferred unit combining compressors and turbines are also given. In one embodiment of the invention, a piston engine is arranged for stratified charging and the power stroke is adjusted to deliver exhaust gases at high pressure. In order to increase the efficiency of the gas turbine, portions of the turbine can be coated with a catalytic material.

9 Claims, 16 Drawing Figures

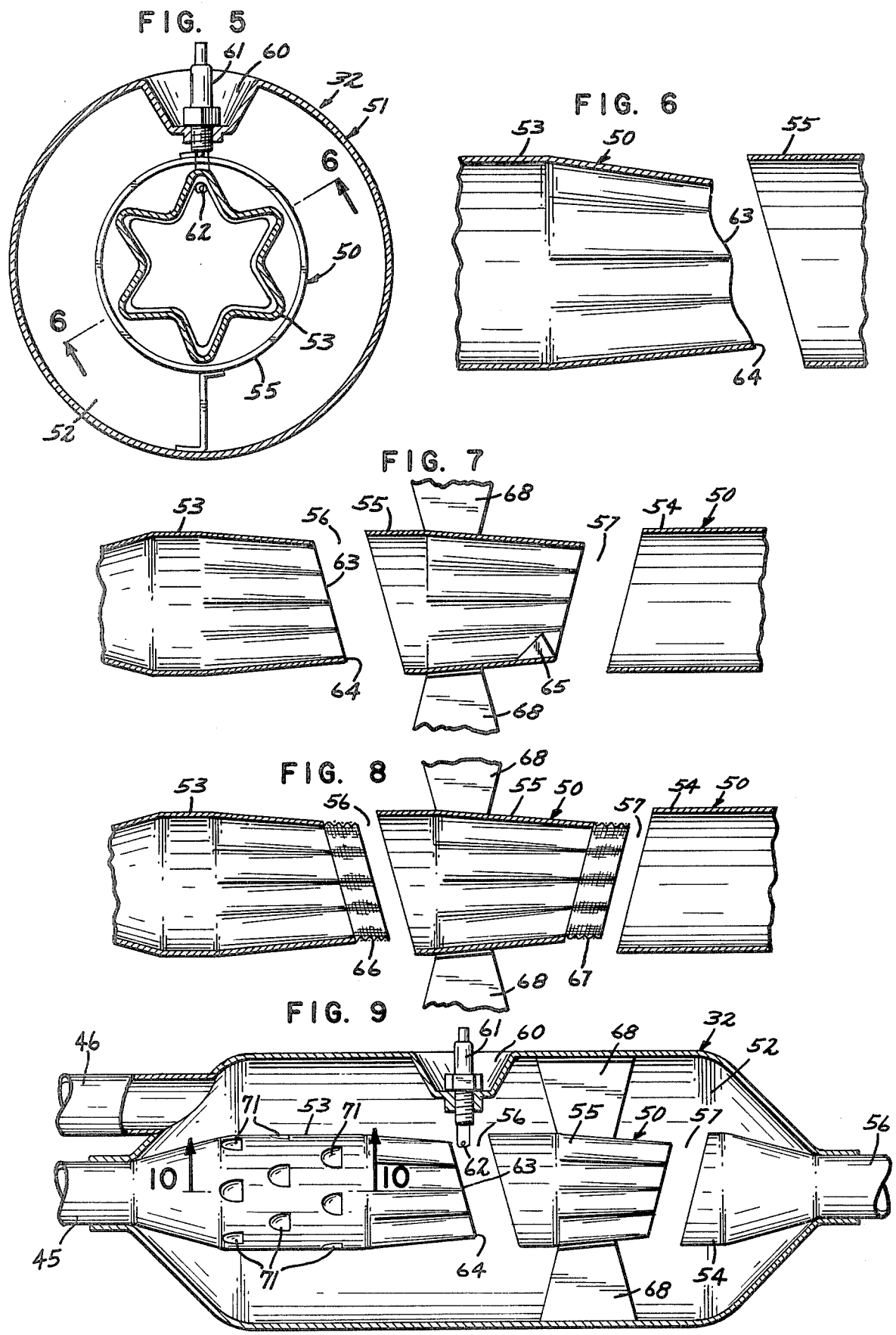

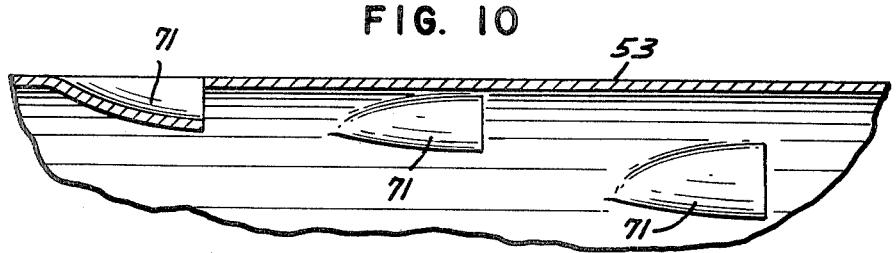
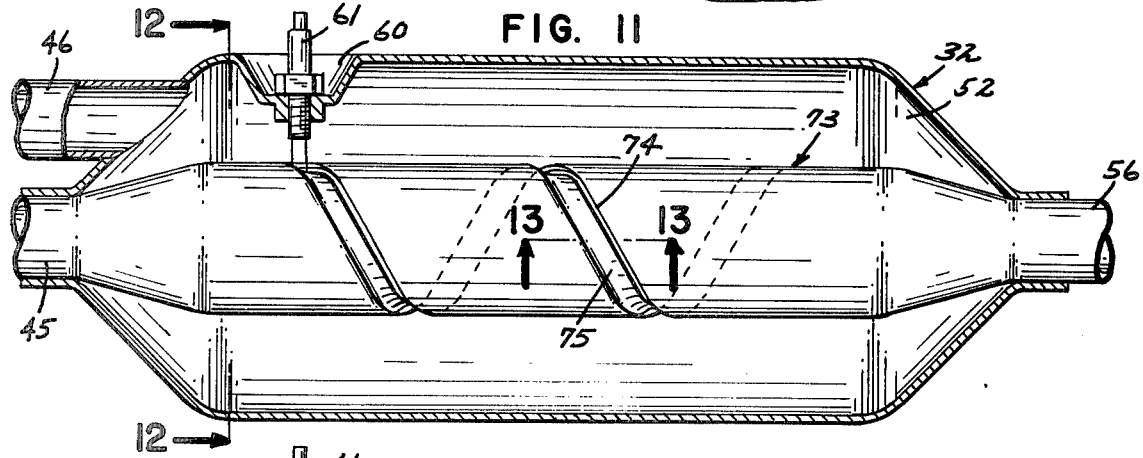
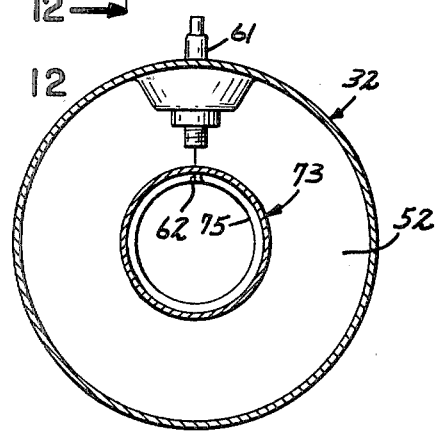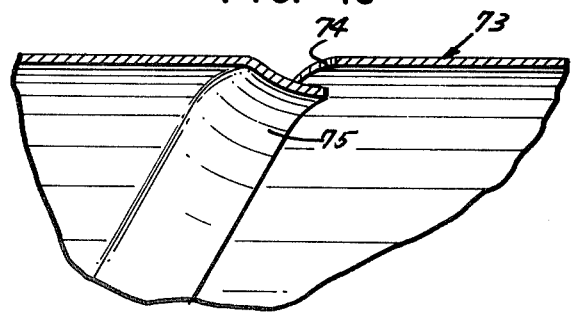

TURBO-EXHAUST CLEANER

This application is a continuation-in-part application of pending application, Ser. No. 596,896, now abandoned filed July 17, 1975.

TECHNICAL FIELD

This invention relates to the field of automotive engineering, and particularly to means for increasing the efficiency of automotive power plants and for reducing the pollution of ambient air by discharge of undesirable engine exhaust gases thereinto.

BACKGROUND

It is well known that internal combustion engines of the movable piston type are inefficient converters from chemical energy to mechanical energy. A major cause for this inefficiency lies in the fact that the combustion of the fuel by the explosion is not complete in two respects. in the first place, there is generally a significant portion of the fuel which is not oxidized at all, and is simply swept out of the cylinder on the exhaust stroke and dumped into the air. In the second place, there is a further significant portion of the fuel which is oxidized only in part. Oxidation of carbon to carbon monoxide releases only one-third as much heat as oxidation of carbon to carbon dioxide. While carbon dioxide is a principal component of engine exhaust gas, it is well known that significant quantities of carbon monoxide are also present, to an extent requiring caution because of its toxic nature. The well known catalytic converter has as one of its functions the oxidation of carbon monoxide to carbon dioxide, a relatively innocuous substance. The conversion, of course, releases the remaining heat, but this now occurs where it cannot be availed of mechanically: it simply raises the temperature of the converter, and thus is a problem in heat disposition.

In the effort to obtain more complete combustion in the engine cylinders, the trend has been to make the mixture as lean as possible, that is, to supply as great a proportion of air as can be tolerated, so that oxygen will be available for combustion. It has also been found that the thermal efficiency of an engine varies with the compression ratio, other things being equal, so a second trend has been to raise the compression ratio as high as other limitations, such as temperature tolerances, will permit.

An unanticipated result of burning relatively lean fuel mixtures after high compression has been the appearance in the exhaust gases of oxides of nitrogen. These oxides are of even greater detriment to the environment than the carbon monoxide, and are not rendered innocuous by a catalytic converter.

One type of emission control device currently in use is the catalytic converter. A very recent type of catalytic converter, known as the "3-way" catalytic converter is described in the November 1978 issue of Popular Science at pages 64–72. This type of catalytic converter generates a considerable amount of heat, yet fails to use the heat for any power utilization. Another type of emission control system is more directly related to the design of the piston engine. This type of a system is the stratified charge system used by the Honda Motor Company. In the stratified charge system, the piston engine has two combustion chambers for each cylinder, a main chamber and a pre-chamber. On the intake stroke, a rich fuel-air mixture enters the pre-chamber through a separate intake valve, and a very lean mixture enters the main chamber in the conventional manner. Under the compression stroke, a moderate fuel-air mixture forms near the pre-chamber opening in the main chamber. The spark plug fires the rich mixture which in turn ignites both the moderate and lean charges.

BRIEF SUMMARY OF THE INVENTION

I propose to improve the overall efficiency of automotive engines, and reduce the pollution of the environment caused by engine exhaust gases, by providing a gas turbine in cooperation with the engine and afterburning the exhaust gases to provide energy useful to drive the turbine. This afterburning takes place under conditions favoring complete oxidation and not conducive to formation of oxides of nitrogen. Moreover, with the second combustion process in operation, the mixture in the main engine can be made richer, in reliance on the second combustion to usefully oxidize any unburned components in the engine exhaust. The turbine is connected to the engine power shaft, and hence the heat of the second combustion is not wasted, but it is converted to mechanical energy. In order to further increase the energy produced by the gas turbine, portions of the turbine including its inlet nozzle, the stator-blades and the turbine blades are coated with a catalytic material. This gain is more than sufficient to permit reducing the compression ratio in the engine, and as a result of the changes in mixture and compression ratios, the formation of oxides of nitrogen is substantially eliminated.

A compressor is required to supply the exhaust gases to the second combustion chamber appropriately, and may be dual to compress the combustion air appropriately as well. If the gases are compressed separately any likelihood of preignition is minimized. It is convenient to make the compressor or compressors and the turbine a single rotary machine, with a single shaft coupled directly or indirectly to the power shaft of the main engine.

I have also found that particular forms of the combustion chamber are preferable, that an ignition arrangement such as a glow plug or catalytic unit is desirable when starting up but becomes unnecessary after operation is established, and that flameholder structure in the chamber is desirable. Under some circumstances, it may be efficient to add fuel independently in the combustion chamber, and I contemplate that provision for doing this is a part of my invention.

In one embodiment of my invention, the piston engine is arranged and modified for stratified charging, i.e. a very lean charge of fuel is initially injected into the cylinder at the beginning of the intake stroke and thereafter a richer charge is directed into the neighborhood of the ignition device. Also, the power stroke of the piston engine is designed and arranged to deliver the exhaust gases at a high pressure which is much higher than in presently designed piston engines.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

FIG. 5 is a sectional view along the line 5—5 of FIG. 4, to a larger scale;

FIG. 6 is an enlarged fragmentary sectional view along the line 6—6 of FIG. 5 showing an alternative edge view;

FIGS. 7 and 8 are fragmentary views, to a larger scale of alternative embodiments of the invention;

FIG. 9 is a longitudinal sectional view of a second combustion chamber;

FIG. 10 is a fragmentary view along the line 10—10 of FIG. 9 to a larger scale;

FIG. 11 is a longitudinal sectional view of a third combustion chamber;

FIG. 12 is a transverse section along the line 12—12 of FIG. 11;

FIG. 13 is a sectional view to a larger scale, taken along the line 13—13 of FIG. 11;

DETAILED DESCRIPTION OF THE INVENTION

Figure 1:
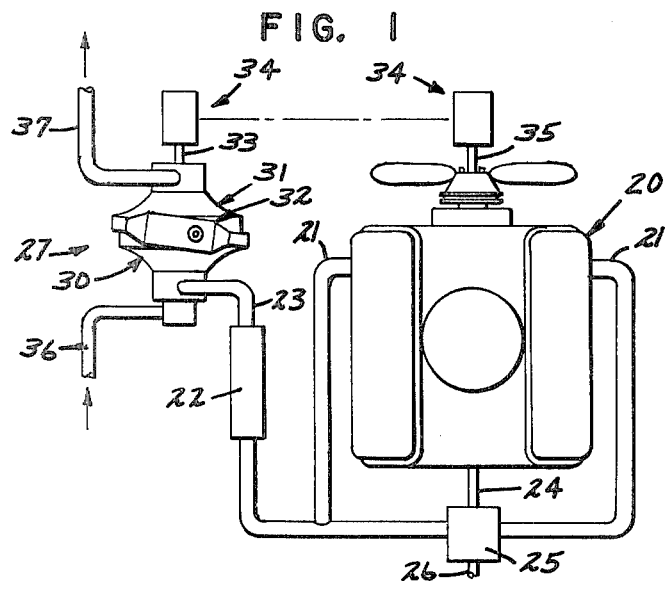
FIGS. 1, 2 and 3 show different ways in which a movable piston engine, one or more compressors, a combustion chamber, and a gas turbine may be assembled to produce my invention.

Referring now to the drawing, FIG. 1 is a schematic showing of one preferred embodiment of the invention. A main engine is shown at 20 and generally is typical of a V-type of engine of the reciprocating piston type: it is understood that other types of engines such as the rotary piston or Wankel engine are equally appropriate. The exhaust manifolds 21 are shown as being led through a common muffler 22 to an exhaust conduit 23. The engine has a power shaft 24 which is connected to the transmission gearing 25 of the vehicle and thence to the vehicle drive shaft 26. While I have illustrated the invention in an automotive application, it is, of course, equally applicable to use with stationary engines. In many applications the use of my invention obviates the need for a muffler entirely.

My invention comprises a unit 27 including a compressor 30 and a gas turbine 31 interconnected by a combustion chamber 32. Compressor 30 and turbine 31 have a common shaft 33, which is connected by suitable gearing or other mechanical drive means 34 to a forward extension 35 of power shaft 24. A second input 36 to compressor 30 provides combustion air, and the gases after passing through the compressor, the combustion chamber, and the turbine are discharged at an outlet 37.

Figure 3:
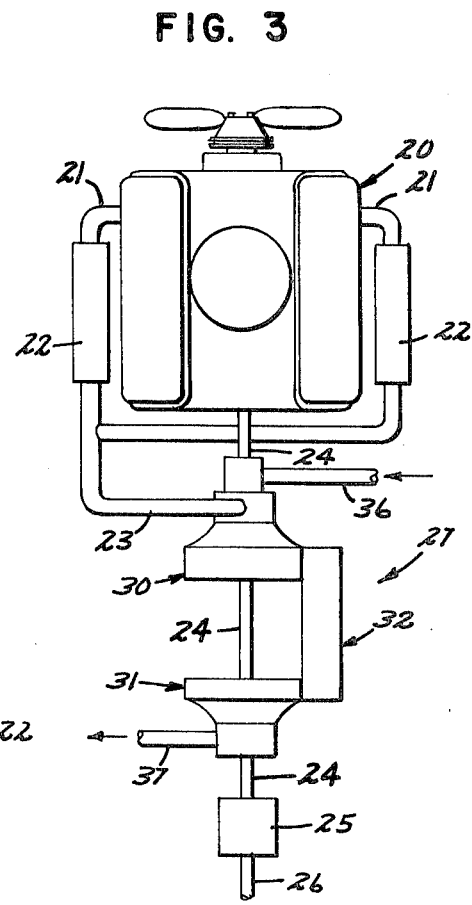
Figure 2:
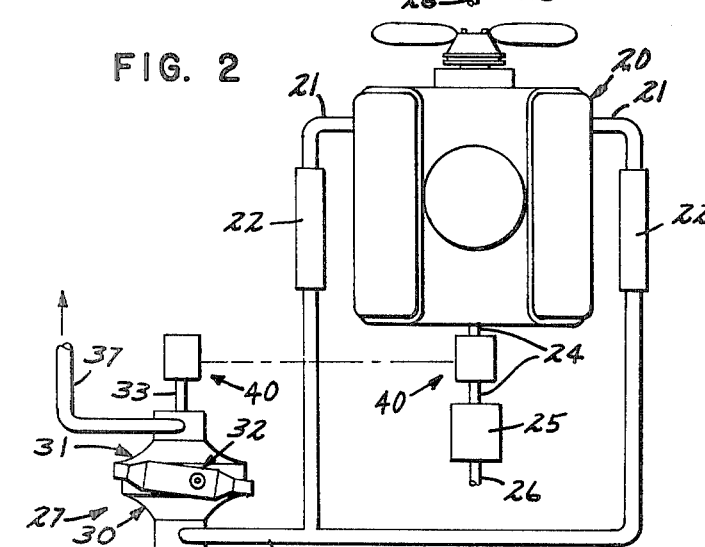

As FIG. 2 shows, unit 27 may be mechanically coupled to shaft 24 at the rear of engine 20 by a connection 40, if this is considered preferable. FIG. 3 shows that when space is available, compressor 30 and turbine 31 may be separate units mounted on shaft 24 and interconnected by a combustion chamber 32.

Figure 4:
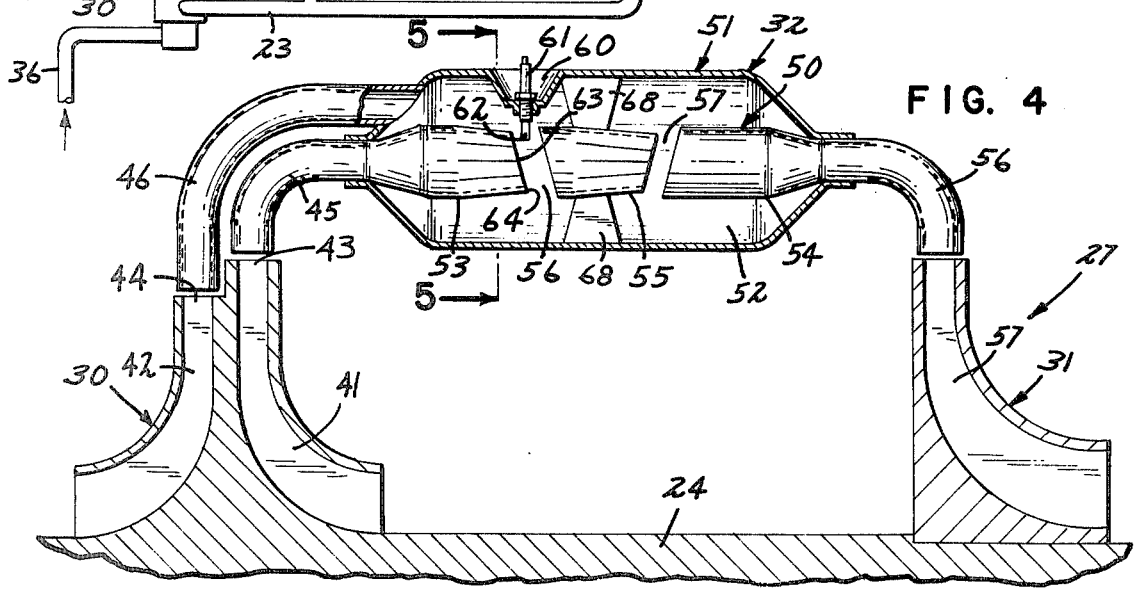
FIG. 4 is a somewhat schematic showing of a preferred combustion chamber associated with a pair of compressors and a gas turbine.

Attention is now directed to FIG. 4, which is somewhat schematic in that the housings for compressor 30 and turbine 31 have been omitted. Compressor 30 includes a first set of blades 41 and a second set of blades 42 driven unitarily by shaft 24. Blades 41 receive the exhaust gas from engine 20 by a housing channel not shown, and eject it radially at 43. Similarly, blades 42 receive combustion air through a suitable housing channel not shown, and eject it radially at 44. It is, of course, possible by well known principles of compressor design to provide for different degress of compression of these two gases, in accordance with the demands of the situation. What is desired from blades 41 is, of course, that the exhaust gas from engine 20 be supplied at 43 without the appearance of any back pressure at the engine output. Likewise, it is desired from blades 42 that the combustion air be supplied at 44 in appropriate quantity to provide oxidation for the unburned components in the exhaust gas.

Combustion chamber 32 has first and second inlets 45 and 46 located to receive the gas flow from blades 41 and 42, respectively. Chamber 32 may be described as comprising an inner tubular member 50 and an outer tubular member 51. Inlet 45 supplies exhaust gas, after compression, to tubular member 50, while inlet 44 supplies combustion air after compression to the space 52 between tubular members 50 and 51. As shown in the figure, member 50 is discontinuous. It consists of an inlet portion 53, an outlet portion 54, and an intermediate portion 55, spaced mutually by gaps 56 and 57. The portions are coaxial. Members 53 and 55 are of reduced dimension at their downstream ends compared to the adjacent ends of portions 55 and 54, so that gaps 56 and 57 act as induction pumps to draw air from the space 52 into the inner tubular member 50 when a gas flow exists through the latter. Inner tubular member 50 is connected to or terminates in an outlet 56 which supplies gas flow to the blades 57 of the turbine 31: the spent gas is discharged from turbine 31 through an outlet in the housing, not shown.

An indentation 60 is formed in member 51 to receive a glow plug or similar ignition initiator 61. The functional tip 62 of member 61 is located at the border of gap 56 where the combustion gas in space 52 meets the combustible gas in member 53, in a manner to facilitate ignition.

Reference to FIG. 5 will make it clear that the tapering outline of portion 53 is brought about by the treatment of the downstream edge 63 of that portion, which is not a smooth uniform curve but is undulated in a manner which results in an intermingling flow therefrom of the gases from inside and outside tubular member 50.

The flame holder effect is facilitated by the fact that gap 56 does not extend perpendicular to the axis of tubular member 53, but at an oblique angle thereto. If the flame in gap 56 tends to die out at a downstream point, it will be reignited by flames still existing at an upstream point of edge 63.

As suggested in FIG. 6, the edge 63 of portion 53 may also be made undulant, to further increase the flow turbulance and hence preserve the flame. It is convenient to also make gap 57 oblique with the axis of member 50. Portion 55 is supported in its axially central porition by a plurality of spokes 68 extending inwardly from member 51 to member 55. The spokes may be streamlined to present minimum resistance to the flow of gas in the member. In addition, a vane 65 is carried in one of the undulations of member 55 to act by the turbulance it creates as a further flame holder at gap 57.

The showing of FIG. 8 is like that of FIG. 7, except that in FIG. 8 the smaller undulated ends of portions 53 and 55 are coated with, carry, or comprise elements 66 and 67 of catalytic material such as platinum. The passage of combustible gases over this material raises their temperature to the kindling point, in the presence of combustion air from space 52, and oxidation occurs with the release of heat energy. It will be appropriate that both types of ignition may be provided simultaneously if desired.

FIG. 9 is generally like FIG. 4 but shows a structure in which the surface of portion 53 is remote from gap 56 is formed with a plurality of inward punchings 71. As shown in FIG. 10, punchings 71 are located so as to draw combustion air from space 52 for mixing with the combustible gas. By this means, more perfect combustion at gap 56 is insured.

A further embodiment of the invention is shown in FIGS. 11–13. Here the inner tubular member 73 is in effect continuous, but is provided with a spiral slot 74 extending along the greater portion of its length. The material 75 of the slot is not fully punched away, but is inwardly depressed to the configuration shown in FIG. 13. This arrangement is such that the flow of gas within the inner tube aspirates air through slot 74 to mix with the combustible gas, again improving the combustion when it occurs in response to igniter 61.

Figure 14:
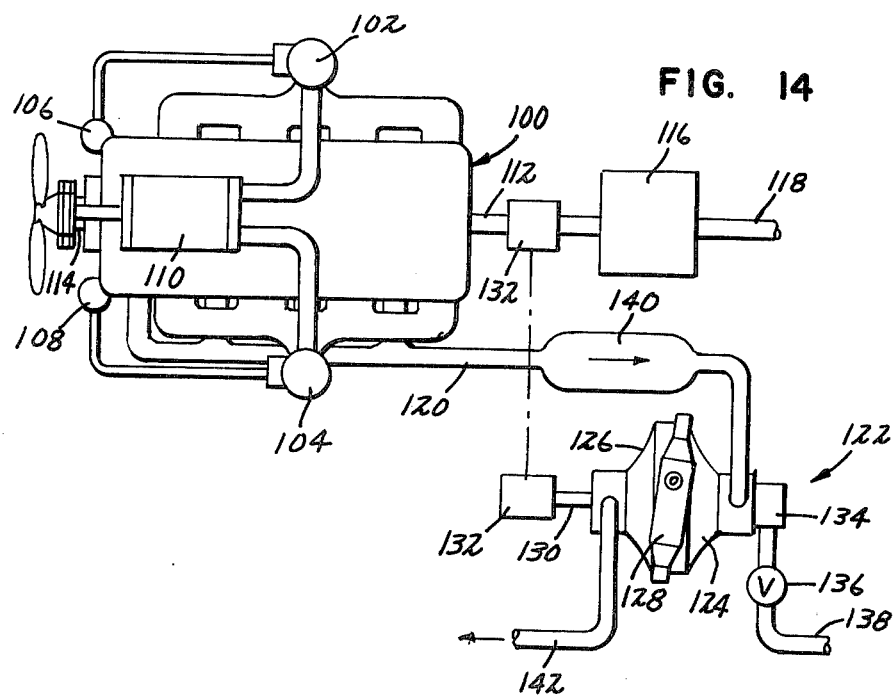
FIG. 14 is a schematic illustration of another embodiment of my invention.
Figure 15:
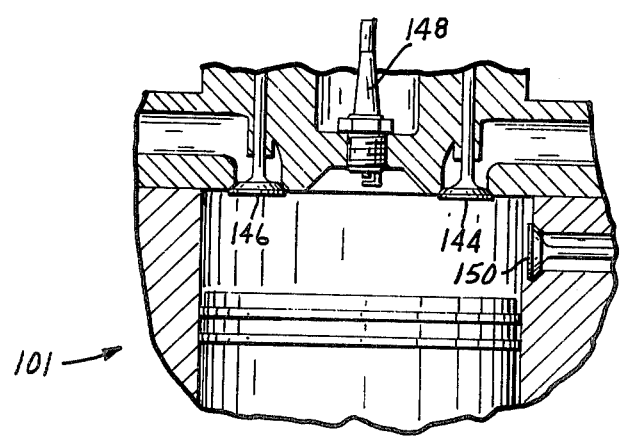
FIG. 15 is a schematic illustration of a piston-cylinder arrangement for use in the embodiment of FIG. 14.

Referring to FIGS. 14 and 15, there is shown schematically a piston-type internal combustion engine 100 and an individual piston combustion chamber 101. A pair of carburetors 102, 104 are used to meter a fuel-air mixture to the engine 100. A fuel pump 106 supplies fuel to the carburetor 102 and a fuel pump 108 supplies fuel to the carburetor 104. A turbocharger 110 is connected to each of the carburetors 102, 104 for turbocharging the fuel-air mixture. A power shaft 112 is driven by the engine 100 and extends rearwardly therefrom. The turbocharger 110 is driven by a forward extension 114 of the power shaft 112. The rear portion of the power shaft 112 is connected through transmission gearing 116 to a vehicle drive shaft 118.

Exhaust gases are supplied through a conduit 120 to a unit 122. The unit 122 is similar to the unit 27. The unit 122 includes a compressor 124 and a gas turbine 126 interconnected by a combustion chamber 128. The compressor 124 and the gas turbine 126 have a common shaft 130, which is connected by suitable gearing or other mechanical drive means 132 to the power shaft 112. If additional air is required for combustion within the combustion chamber 128 a pump 134 may be activated and a valve 136 may be opened in conduit 138 so as to draw in the needed additional air. An area of expanded volume 140 is provided within the conduit 120 so as to even out any exhaust surges from the engine 100 prior to the entry of the exhaust gases into the unit 122. Exhaust gases exiting the gas turbine 126 are passed out to atmosphere through an exhaust conduit 142.

Each piston combustion chamber 101 has a first intake valve 144 and a second intake valve 146. An ignition device 148 is provided, as well as an out-take valve 150. Intake air is introduced into the piston engine 100 by the turbocharger 110. The turbocharger 110 is designed to deliver this intake air at an elevated pressure of two or more atmospheres.

The first intake valve 144 is adjusted to supply the cylinder 101 with a lean fuel mixture which is mixed with the amount of air sufficient to leave a large amount of oxygen over to complete the combustion of unburned elements within the unit 122. The lean fuel mixture would mix with a rather large quantity of exhaust gas left over in the cylinder 101 from the combustion in the previous power stroke. The manner of leaving exhaust gas within the cylinder 101 will be explained more fully hereinafter. The remaining exhaust gas within the cylinder is larger than the amount of exhaust gas left within the present conventional piston engines. The mass of exhaust gases remaining in the cylinder 101 at the beginning of the intake stroke is large because of the larger size or volume of the combustion chamber and because of the very high pressure of the exhaust gases. This feature will eliminate the necessity for "recirculating" exhaust gases, thus simplifying construction.

The second intake valve 146 opens simultaneously with the closing of the first intake valve 144 shortly before the ending of the intake stroke. A rich charge is injected through the second intake valve 146 and is directed in the neighborhood of the ignition device 148. Immediately upon ignition of the final fuel charge all valves would close and the compression stroke would begin. The lean fuel-air mixture to the first intake valves 144 is supplied through the first carburetor 102 and the rich fuel-air mixture is supplied to the second intake valves 146 through the second carburetor 104. In addition to the capability of introducing rich and lean mixtures by use of the two intake valves 144, 146, two different types of fuel can also be injected. For example, an easily ignitable fuel for the richer stratified fuel charge can be used. While a lesser expensive fuel, such as alcohol, either methol or ethol, or a mixture thereof can be used for the larger and leaner charge.

In order to obtain a large quantity of residual exhaust gas after a power stroke, the power stroke of the piston engine 100 is adjusted to end long before the power stroke ends in the present conventional internal combustion engines. Thus, the pressure of the exhaust gases leaving the piston engine 100 will be much higher than in presently designed engines. The power stroke will then end and the exhaust stroke will begin while internal pressures are much higher than in conventional piston engines. The exhaust pressure should be adjusted to be as high as design parameters will permit. The higher the pressure, the greater will be the efficiency of the gas turbine 126.

Figure 16:
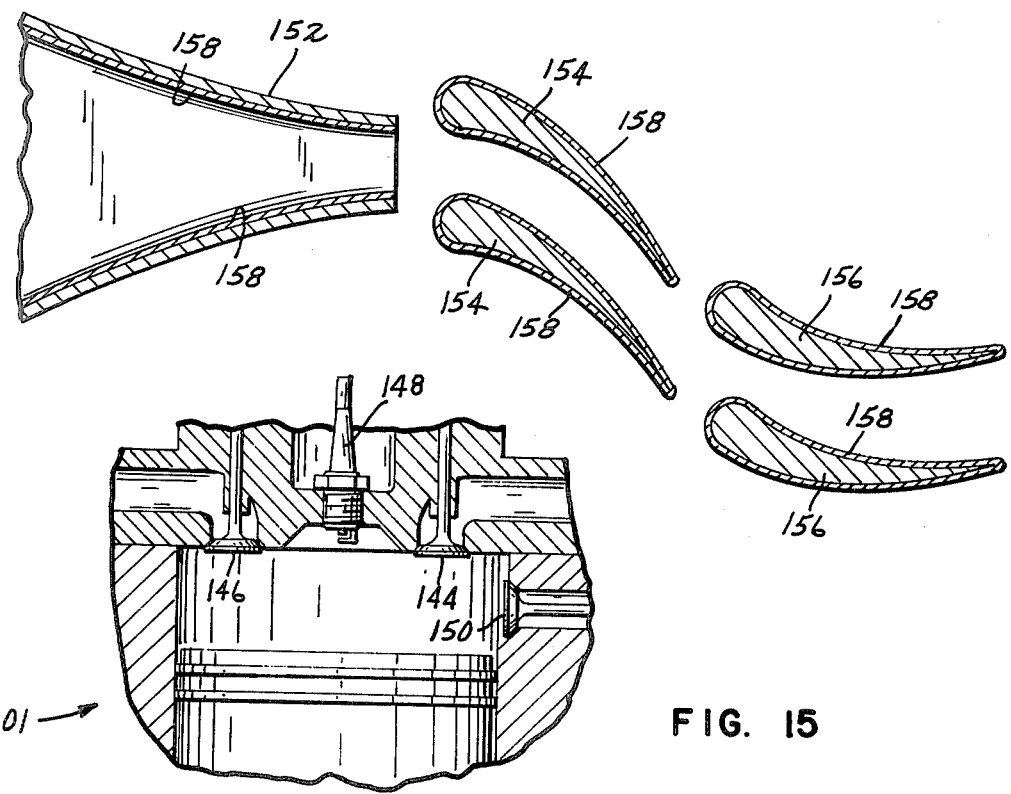
FIG. 16 schematically illustrates coating portions of a gas turbine with a catalytic material.

Referring to FIG. 16, there is schematically shown portions of a gas turbine. An intake nozzle 152 directs exhaust gases toward stator blades 154 and turbine blades 156. Nozzle 152 and blades 154, 156 are illustrative of portions of gas turbines which can be used in the above-described embodiments of my invention. In order to increase the power or energy generated by a gas turbine, the nozzle 152 and the blades 154, 156 are coated with a catalytic material 158. Gas turbines operate from the impulse given to the moving blades by expanding gases. Since the turbine blades 156 and the areas of the turbine near by are coated with a catalytic material, the gases expand at the blade surfaces such that the gas velocities are increased at that point. The intake nozzle 152 and the blades 154, 156 can be coated in a conventional manner with any one or more conventional catalytic materials, such as finely divided platinum.

I have found that the use of the catalytic coating 158 is especially useful in the embodiment of my invention shown in FIGS. 14 and 15. In this embodiment, the fuel-air intake mixture can be adjusted so as to contain enough oxygen remaining in the exhaust gases to combine with the remaining unburned elements in the catalytic combustion areas of the turbine 126. However, if it is found not practical to adjust the oxygen content of the exhaust gases, the auxiliary pump 132 can be used to draw in an extra amount of air. In this embodiment, the volumetric ratio of compression would be much less than used in current conventional gasoline engines, and would be about 8:1. The turbine 126 would be designed to extract a large or greater proportion of energy from the combustion of the fuel. The turbine 126 will draw its energy from the pressure of the exhaust gases as they leave the piston engine 100, and in addition from the expansion of the exhaust gases resulting from the heat energy liberated by the final combustion of the unburned elements due to the action of the catalytic surfaces 158 located in the turbine 126. The proportion of piston engine power to the turbine power could be less than 1:2 of the total power delivered by the piston-turbine engine combination.

In my combined piston-turbine engine it is desirable that the pressure of piston exhaust be as high as practicable, for example, 100 P.S.I. or more.

From the foregoing it will be clear that I have invented a new method and means for improving the efficiency of internal combustion engines which also result in great reduction of the discharge into the ambient air of pollutants such as carbon monoxide and oxides of nitrogen.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. In combination: an internal combustion engine having a power shaft and an exhaust conduit for conducting exhaust gas away from said internal combustion engine;
   a discrete combustion chamber having an inlet and outlet;
   a gas turbine having an inlet, an outlet, an intake nozzle, a plurality of stator blades, a plurality of turbine blades, and a drive shaft;
   a coating of catalytic material applied to portions of said gas turbine which come into contact with said exhaust gas, said coating increasing the energy generated by said gas turbine;
   means for mechanically coupling the drive shaft of said gas turbine to the power shaft of said internal combustion engine;
   means connecting said exhaust conduit to the inlet of said discrete combustion chamber for combustion therein, said connecting means including a compressor for compressing said exhaust gases connected to the drive shaft of said gas turbine for rotation therewith; and
   means connecting the outlet of said discrete combustion chamber to the inlet of said gas turbine whereby the combusted gases leaving said discrete combustion chamber drive said gas turbine, and whereby the energy produced by said gas turbine is coupled to said power shaft to increase the efficiency of said internal combustion engine.

2. The structure of claim 1 wherein said catalytic material is applied to said intake nozzle, said stator blades and said turbine blades.

3. The structure of claim 1 or 2 wherein the combustion chamber includes means for initiating combustion therein.

4. The structure of claim 1 wherein the combustion chamber includes flame holder means for maintaining combustion therein.

5. The structure of claim 1 including a pump means for pumping air to said combustion chamber.

6. The structure of claim 1 wherein the internal combustion engine is a piston engine having a plurality of combustion cylinders.

7. The structure of claim 6 including means for supplying a stratified charge to each of said combustion cylinders.

8. The structure of claim 7 including adjusting the stroke of the engine to end early within the stroke to increase the pressure at which the gas is exhausted.

9. The structure of claim 7 or 8 wherein said stratified charge supplying means includes a first carburetor for supplying a lean fuel mixture at the beginning of a power stroke in each of the combustion cylinders of said engine and a second carburetor for supplying a rich fuel mixture to said combustion chambers after said lean fuel mixture is supplied.

* * * * *